United States Patent
Liu et al.

(10) Patent No.: US 12,531,771 B2
(45) Date of Patent: *Jan. 20, 2026

(54) TRANSMITTER AND RECEIVER FOR, AND METHOD OF, TRANSMITTING AND RECEIVING SYMBOLS OVER TIME VARYING CHANNELS WITH DOPPLER SPREAD

(71) Applicants: Continental Automotive Technologies GmbH, Hannover (DE); NANYANG TECHNOLOGICAL UNIVERSITY, Singapore (SG)

(72) Inventors: Yujie Liu, Singapore (SG); Yong Liang Guan, Singapore (SG); David González González, Hannover (DE)

(73) Assignees: Continental Automotive Technologies GmbH, Hannover (DE); Nanyang Technological University, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 19/091,125

(22) Filed: Mar. 26, 2025

(65) Prior Publication Data
US 2025/0227015 A1  Jul. 10, 2025

Related U.S. Application Data

(63) Continuation of application No. PCT/IB2023/059741, filed on Sep. 29, 2023.

(30) Foreign Application Priority Data

Oct. 2, 2022  (DE) .................... 10 2022 125 445.3

(51) Int. Cl.
*H04L 27/26* (2006.01)
*H04L 25/02* (2006.01)
*H04B 7/01* (2006.01)

(52) U.S. Cl.
CPC ........ *H04L 27/2639* (2013.01); *H04L 25/024* (2013.01); *H04L 27/2602* (2013.01);
(Continued)

(58) Field of Classification Search
CPC ............ H04L 27/2639; H04L 27/2607; H04L 27/2605; H04L 27/2669; H04L 27/2671;
(Continued)

(56) References Cited

U.S. PATENT DOCUMENTS

2020/0322185 A1  10/2020  Kons et al.
2020/0389268 A1*  12/2020  Sathyanarayan ............ H04L 27/26532

(Continued)

FOREIGN PATENT DOCUMENTS

DE  102021126321 A1  12/2022
DE  102022106409 A1  4/2023
EP  3761583 A1  1/2021

OTHER PUBLICATIONS

Hang Zhao, Dongxuan He, Ziqi Kang, and Hua Wang, Orthogonal Time Frequency Space (OTFS) With Dual-Mode Index Modulation, 2021 IEEE, IEEE Wireless Communications, vol. 10 Issue: 5. (Year: 2021).*

(Continued)

*Primary Examiner* — Khanh C Tran
(74) *Attorney, Agent, or Firm* — Buchanan Ingersoll & Rooney PC

(57) ABSTRACT

A communication frame for an OTFS transmission system includes first-type and second-type blocks. The first-type block includes pilot signals, guard signals, and data signals, (Continued)

the second-type block exclusively includes data signals. The pilot symbols, guard signals, and data symbols of the first-type block, and the data symbols of the second-type block, are arranged along the points of a grid in the delay-Doppler domain. In the communication frame, a first-type block is followed by a second-type block, and a second-type block is followed by a first-type block. In the first-type block at least one pilot symbol is surrounded on at least three sides by one or more guard symbols. Points of the grid of the first-type blocks in the delay-Doppler domain that are not occupied by pilot symbols or guard symbols are used for data symbols. The communication frame permits determining oscillator frequency offset and channel coefficients in a receiver.

15 Claims, 5 Drawing Sheets

(52) U.S. Cl.
CPC .... *H04L 27/26532* (2021.01); *H04L 27/2669* (2013.01); *H04L 27/2686* (2013.01); *H04L 27/2695* (2013.01); *H04B 7/01* (2013.01)

(58) Field of Classification Search
CPC ............ H04L 27/2672; H04L 27/2675; H04L 27/2673; H04L 27/2686; H04L 27/2681
See application file for complete search history.

(56) References Cited

U.S. PATENT DOCUMENTS

| | | | |
|---|---|---|---|
| 2021/0112527 A1* | 4/2021 | Pfadler | ................. H04W 72/04 |
| 2022/0158780 A1 | 5/2022 | Namboodiri et al. | |
| 2022/0385508 A1 | 12/2022 | Pfadler et al. | |
| 2022/0393921 A1* | 12/2022 | Pfadler | ............... H04L 25/0224 |
| 2023/0208575 A1 | 6/2023 | Yuan et al. | |
| 2023/0318894 A1 | 10/2023 | Yuan et al. | |
| 2024/0250858 A1 | 7/2024 | Liu et al. | |
| 2024/0267275 A1 | 8/2024 | Wang et al. | |
| 2025/0055738 A1 | 2/2025 | Liu et al. | |

OTHER PUBLICATIONS

Yujie Liu, Yong Liang Guan, David Gonzalez G., A Novel Dual-Rate OTFS System Resilient to OFO and Doppler Spread, 2023 IEEE, 2023 IEEE International Conference on Communications (ICC): Signal Processing for Communications Symposium. (Year: 2023).*

German Office Action with English translation issued in corresponding Patent Application No. 10 2022 125 445.3 dated Jun. 30, 2023, 6 pages.
German Office Action with English translation issued in corresponding Patent Application No. 10 2022 127 946.4 dated Jun. 30, 2023, 7 pages.
International Search Report (PCT/ISA/210) and Written Opinion (PCT/ISA/237) mailed on Feb. 5, 2024, by the European Patent Office as the International Searching Authority for International Application No. PCT/IB2023/060501, 14 pages.
International Search Report (PCT/ISA/210) and Written Opinion (PCT/ISA/237) mailed on Jan. 5, 2024, by the European Patent Office as the International Searching Authority for International Application No. PCT/IB2023/059741, 9 pages.
Liu et al., "A Novel Dual-Rate OTFS System Resilient to OFO and Doppler Spread", IEEE International Conference on Communications (ICC): Signal Processing for Communications Symposium, May 28, 2023, pp. 1313-1318.
Liu et al., "Near-Optimal BEM OTFS Receiver With Low Pilot Overhead for High-Mobility Communications", IEEE Transactions on Communications, vol. 70, No. 5, May 2022, pp. 3392-3406.
Mishra et al., "OTFS Channel Estimation And Data Detection Designs With Superimposed Pilots", arXiv.org, Cornell University Library, 201 201 Olin Library at Cornell University in Ithaca, NY 14853, Oct. 28, 2020, XP081801129, 30 pages.
Raviteja et al., "Embedded Delay-Doppler Channel Estimation for Orthogonal Time Frequency Space Modulation", Proceedings of the IEEE 88th Vehicular Technology Conference, Jun. 20, 2023, 5 pages.
Yuan et al., "Integrated Sensing and Communication-Assisted Orthogonal Time Frequency Space Transmission for Vehicular Networks", IEEE Journal of Selected Topics n Signal Processing, vol. 15, No. 6, Nov. 2021, pp. 1515-1528.
Office Action issued by the U.S. Patent and Trademark Office in the U.S. Appl. No. 19/112,424, mailed May 23, 2025, U.S. Patent and Trademark Office, Alexandria, VA. (15 pages).
Office Action issued by the U.S. Patent and Trademark Office in the U.S. Appl. No. 19/112,108, mailed May 28, 2025, U.S. Patent and Trademark Office, Alexandria, VA. (9 pages).
Office Action issued by the U.S. Patent and Trademark Office in the U.S. Appl. No. 19/091,239, mailed May 29, 2025, U.S. Patent and Trademark Office, Alexandria, VA. (9 pages).
Notice of Allowance issued by the U.S. Patent and Trademark Office in the U.S. Appl. No. 19/091,239, mailed Oct. 9, 2025, U.S. Patent and Trademark Office, Alexandria, VA. (8 pages).
Notice of Allowance issued by the U.S. Patent and Trademark Office in the U.S. Appl. No. 19/112,108, mailed Oct. 10, 2025, U.S. Patent and Trademark Office, Alexandria, VA. (7 pages).

* cited by examiner

TRANSMITTER AND RECEIVER FOR, AND METHOD OF, TRANSMITTING AND RECEIVING SYMBOLS OVER TIME VARYING CHANNELS WITH DOPPLER SPREAD

CROSS REFERENCE TO RELATED APPLICATIONS

This application is a continuation of International Application No. PCT/IB2023/059741, filed Sep. 29, 2023, which claims priority to German Patent Application No. 10 2022 125 445.3, filed Oct. 2, 2022, the contents of such applications being incorporated by reference herein.

FIELD OF THE INVENTION

The present invention relates to a method of receiving symbols over an orthogonal time frequency space (OTFS) communication channel subject to Doppler spread and a receiver implementing the method.

BACKGROUND

The sixth generation (6G) wireless communications and beyond are expected to serve a large number of high-mobility users, e.g., vehicles, subways, highways, trains, drones, low earth orbit (LEO) satellites, etc.

The preceding fourth and fifth generation (5G) wireless communications use orthogonal frequency division multiplexing (OFDM), which provides high spectral efficiency and high robustness against frequency selective fading channel, and also allow for using low-complexity equalisers. However, due to speed-dependent Doppler shifts or spreads and quickly varying multipath reception, high-mobility communications suffer from severe time and frequency dispersiveness. Time and frequency dispersiveness each cause signal fading at the receiver, and the fading is thus also referred to as doubly selective channel fading. Doubly selective channel fading significantly impairs the performance of OFDM communication.

As an alternative to OFDM, OTFS modulation was proposed as a solution for coping with doubly selective fading channels, offering higher reliability over OFDM.

OTFS modulation is a 2D modulation scheme that multiplexes information QAM symbols over carrier waveforms that correspond to localized pulses in a signal representation that is referred to as delay-Doppler representation. The OTFS waveforms are spread over both time and frequency while remaining roughly orthogonal to each other under general delay-Doppler channel impairments. In theory, OTFS combines the reliability and robustness of spread spectrum with the high spectral efficiency and low complexity of narrowband transmission. FIG. 1 shows a block diagram of a general OTFS transmission system. A transmitter 200 comprises a first transmitter-side transformation unit 202 and a second transmitter-side transformation unit 204. Serial binary data is input to a signal mapper (not shown in the figure) that outputs a two-dimensional sequence of information symbols x[k, l] in which the QAM symbols are arranged along the delay period and the Doppler period of the delay-Doppler domain. The information symbols comprise data symbols, pilot symbols and guard symbols surrounding the pilot symbols. The two-dimensional sequence of information symbols x[k, l] is input to the first transmitter-side transformation unit 202 and is subjected to an inverse Finite Symplectic Fourier Transformation (IS-FFT), which produces a matrix X[n, m] that represents the two-dimensional sequence of information symbols x[k, l] in the time-frequency domain. As the transmitter transmits in the time domain, a further transformation in the second transmitter-side transformation unit 204 is required, which produces the signal s[t] in the time domain, e.g., a Heisenberg transformation. The signal s[t] is then transmitted via an antenna 206 over the communication channel.

In a realistic environment the transmitted signal, on its way from the transmitter through the communication channel to the receiver, is subject to doubly selective fading with Doppler spread. The received signal is a superposition of a direct copy and a plurality of reflected copies of the transmitted signal, where each copy is delayed by a path delay that is dependent from the length of the signal's path delay and is frequency shifted by the Doppler shift that depends from the differential speed between transmitter, reflector, and receiver. Each of the signal copies is weighted in accordance with its particular path delay and differential speed. Typical Doppler shifts are on the order of 10 Hz-1 kHz, though larger values may occur in scenarios with extremely high mobility (e.g., high-speed trains) and/or high carrier frequency. As in realistic environments it is very likely that multiple reflectors and/or moving reflectors are present, the received superimposed signal is spread out over a frequency range rather than merely shifted in frequency, and the signal deformation is thus also referred to as Doppler spread. In the following description the realistic communication channel is also referred to as practical communication channel.

In FIG. 1 the practical communication channel is represented by the undisturbed radio waves emitted from the transmitter antenna 206 and the various unordered radio waves coming from different directions and with different distances to each other at the receiver antenna 302. The radio waves may arrive at the receiver's antenna directly or after being reflected one or several times at one or more stationary and/or moving objects, which may introduce Doppler shift and different delays to the reflected radio waves.

The receiver 300 picks up the received signal r[t] in the time domain, which is provided to a first receiver-side transformation unit 304, in which it is subjected to a Wigner transform for transforming the received signal r[t] into a matrix Y[n, m] representing the received signal r[t] in the time-frequency domain. For enabling signal detection in the delay-Doppler domain the matrix Y[n, m] is then provided to a second receiver-side transformation unit 306, where it is subjected to a Finite Symplectic Fourier Transformation (SFFT), which outputs a two-dimensional sequence of information symbols y[k, l] in the delay-Doppler domain. The two-dimensional sequence of information symbols y[k, l] is input to a channel estimation and equalisation block 310, which performs channel estimation CE and signal detection SD and reconstructs the symbols that were originally transmitted, and ultimately to a de-mapper that outputs the binary data that was originally transmitted (de-mapper not shown in the figure).

While the superiority of OFTS modulation under ideal conditions is undisputed, practical limitations in cost-effective applications thereof can present obstacles for its wide adaptation, inter alia, carrier frequency offset (CFO).

CFO is the carrier frequency mismatch between transmitter and receiver, which is caused by the Doppler effect and radio frequency (RF) device components. The CFO caused by the Doppler effect is typically referred to as Doppler shift or Doppler spread, while the CFO caused by local crystal oscillators (XOs) is known as oscillator frequency offset (OFO).

There are three main types of crystal oscillators, namely free-running XO, temperature-controlled XO (TCXO), and oven-controlled XO (OCXO). Free-running XO are the cheapest but suffer from the largest frequency error, for instance, between ±10 and ±20 ppm, where ppm denotes parts per million. OCXO can reduce the frequency error to 0.0015 ppm, while incurring very high equipment cost of up to 2000 times that of a free-running XO and also incurring increased power cost. TCXO are a good trade-off between free-running XO and OCXO. It is much less expensive than OCXO, about five times the cost, and the frequency error can be reduced to ±1.5 ppm.

The OFO is typically much bigger than the Doppler shift or spread. For example, when the carrier frequency is 4 GHZ, a TCXO with a frequency error±1.5 ppm may result in an OFO of ±6 kHz, which is more significant than the Doppler frequency shift of 0.5 to 2 kHz for velocities between 125 to 500 km/h. It is noted that the Doppler frequency shift is added to the OFO, further increasing the maximum doppler frequency shift at a receiver.

It is, therefore, desirable to optimize the performance of an OTFS communication system with respect to spectral efficiency and reliability in the presence of OFO and using communication channels subject to Doppler spread.

SUMMARY OF THE INVENTION

This is addressed by an aspect of the present invention, which proposes a method for estimating and compensating large OFO, e.g., larger than 0.5 ppm, in OTFS receivers, in particular in OTFS transmissions having low pilot overhead and high spectral efficiency. An aspect of the invention also proposes a two-dimensional arrangement of pilot symbols and data symbols of a communication frame with dual-rate data and dedicated pilots (DP), for an OTFS transmission system for use in the method, and further proposes a time-frequency distortion resilient OTFS (TFDR-OTFS) transmitter and a corresponding receiver for transmitting and receiving, respectively, communication frames in accordance with an aspect of the invention, for high-mobility communication subject to OFO due to the local XO. The expression dual-rate refers to multiplexing of low-rate data and high-rate data, also enabling in-band signaling in the control and user planes. In-band signaling may be used for transmitting both UE-specific control information and common control information.

In the following description, an analytical OTFS system model considering OFO will be presented, before a two-dimensional arrangement of pilot symbols and data symbols of a communication frame for an OTFS transmission system for use in the inventive method is proposed, and finally the proposed TFDR-OTFS receiver with dual-rate data and DP will be discussed in detail.

Throughout this specification, bold symbols represent vectors or matrices. Superscripts T, H and †, respectively denote the transpose, complex conjugate transpose and pseudo inverse of a vector or matrix. diag {a} is a diagonal matrix with vector a on its diagonal, while diag {A} is a vector whose elements are from the diagonal of matrix A. ⊗ is the Kronecker product.

In the OTFS system model with OFO included, N and M represent the dimensions of the delay grid and the Doppler grid, respectively, in which the symbols are arranged. The transmitted complex OTFS matrix x is defined as $$x = [x[0,0], x[0,1], \ldots, x[0, M-1], \ldots, x[N-1, 0], x[N-1, 1], \ldots, x[N-1, M-1]]^T$$

and the received OTFS matrix y is defined as $$y = [y[0,0], y[0,1], \ldots, y[0, M-1], \ldots, y[N-1, 0], y[N-1, 1], \ldots, y[N-1, M-1]]^T$$

$H_t$ is the MN×MN time varying channel matrix in the time domain, where Jakes' model is considered and the maximum Doppler frequency is denoted as $f_D$. Define $\phi$ ($\phi \in [-e_{ofo}, e_{ofo})$) as the OFO, where $e_{ofo}$ is the largest frequency error of the XO in units of ppm. The received OTFS signal vector y in the presence of OFO can be written as, $$y = (F_N \otimes I_M)E(\phi)H_t(F_N^H \otimes I_M)x + w,$$

where $$E(\Phi) = \text{diag}\left\{\left[1, e^{j2\pi\phi}{M}, \ldots, e^{j2\pi\phi(MN-1)}{M}\right]^T\right\}$$

is the OFO matrix, $F_N$ the discrete Fourier transform (DFT) matrix, $I_M$ the M×M identity matrix, and w the additive white Gaussian noise vector. By adopting generalized complex exponential basis expansion modeling (GCE-BEM) to the model $H_t$, e.g., as presented in German patent application No. 10 2022 106 409.3, the entirety of its content being incorporated herein by reference, y is further represented by $$y = \sum_{q=0}^{Q} (F_N \otimes I_M)E(\phi)\text{diag}\{b_q\}F_{MN}^H \text{diag}\{F_{MN \times L}c_q\}F_{MN}(F_N^H \otimes I_M)x + z_{mod} + w,$$

where $b_q$ and $c_q$ are respectively the q-th GCE-BEM basis function and coefficient, Q denotes the GCE-BEM order which relates to $f_D$, $F_{MN}$ is the DFT matrix, and $z_{mod}$ is the GCE-BEM modeling error.

In the following, the element-wise input-output relation between x[k, l] and y[k, l] is derived by considering complex exponential basis expansion modelling (CE-BEM). At the transmitter, after applying an inverse symplectic finite Fourier transform (ISFFT) and Heisenberg transform, the time-domain symbols s[n, m] are written as $$s[n, m] = \sum_{k=0}^{N-1} x[k, m]e^{j2\pi\frac{nk}{N}}.$$

Define h[t, l'] as the channel gain of the l'-th path (l'=0, 1, ..., L) at the t-th (t=0, 1, ..., MN−1) time instant, where L denotes the channel length. After propagating through the doubly selective fading channel, the received time-domain symbols r[n, l] are formulated as $$r[n, l] = e^{j2\pi\phi(nM+l)/M} \sum_{q=0}^{Q} \sum_{l'=0}^{L} h[nM+l, l']s[n, l-l']$$

$$= e^{j2\pi\phi(nM+l)/M} \sum_{q=0}^{Q} \sum_{l'=0}^{L} \sum_{k'=0}^{N-1} C_q[l']x[k', l-l']e^{j2\pi q'\frac{nM+l}{MN}} e^{j2\pi\frac{nk'}{N}} + e[n, l],$$

where $$q' = q - \left\lceil \frac{Q}{2} \right\rceil,$$

l≥L are assumed, and e[n, l] is the modeling error in the time domain due to the CE-BEM modeling. At the receiver, after executing the SFFT and Wigner transforms, the received symbols in the delay-Doppler domain y[k, l] are given by $$y[k, l] = \sum_{n=0}^{N-1} r[n, l]e^{j2\pi\frac{-nk}{N}}$$

$$= \sum_{q=0}^{Q} \sum_{l'=0}^{L} \sum_{k'=0}^{N-1} \sum_{n=0}^{N-1} e^{j2\pi\phi(nm+l)/M} C_q[l']x[k', l-l']e^{j2\pi q'\frac{kM+l}{MN}} e^{j2\pi\frac{nk'}{N}} e^{j2\pi\frac{-nk}{N}} + z[k, l]$$

$$= e^{j2\pi\phi l/M} \sum_{q=0}^{Q} \sum_{l'=0}^{L} \sum_{k'=0}^{N-1} \sum_{n=0}^{N-1} C_q[l']x[k', l-l']e^{j2\pi q'\frac{kM+l}{MN}} e^{j2\pi\frac{nk'}{N}} e^{j2\pi\frac{-nk}{N}} e^{\frac{j2\pi\phi nN}{N}} + z[k, l]$$

$$= e^{j2\pi\phi l/M} \sum_{q=0}^{Q} \sum_{l'=0}^{L} C_q[l']x[k-q'-N\phi, l-l']e^{j2\pi\frac{q'l}{MN}} + z[k, l],$$

$$= \sum_{q=0}^{Q} \sum_{l'=0}^{L} C_q[l']x[k-q'-N\phi, l-l']e^{j2\pi\frac{(q'+N\phi)l}{MN}} + z[k, l],$$

where z[k, l] is the modeling error in the delay-Doppler domain due to the CE-BEM modeling. Compared to an ideal system without OFO this presents two issues:
i) more symbols in the Doppler-domain are interfering with each other and, thus, the inter-Doppler interfere is stronger, and
ii) the phase of the received signal is changed by introducing an additional exponential term $$e^{\frac{j2\pi\phi l}{M}}.$$

Consequently, if the OFO is not properly addressed, the OTFS modulation will lose its superior performance in high-mobility communications.

In addition, due to the presence of OFO, the OTFS channel estimation gets more challenging. Referring to FIG. 2, assume a scenario in which the carrier frequency $f_c$ set to 4 GHZ, the velocity to v=125 km/h, and the frequency error of the XO is ±1.5 ppm. The maximum Doppler frequency is calculated as $f_D$=500 Hz, and the OFO frequency is $f_{OFO}$=±6 KHz. FIG. 2 depicts an example of the possible Doppler spectrum, with $f_D$=500 Hz and $f_{OFO}$=−6 KHz, 0, 6 KHz. It is readily apparent that the OFO will shift the Doppler spectrum leftward or rightward, and thus, the maximum Doppler frequency is increased to $f_D+f_{OFO}$. In known OTFS channel estimators, e.g., those discussed in German patent application No. 10 2022 106 409.3 or in German patent application No. 10 2021 126 321.2, the subspaces or BEM basis functions need to be regenerated based on the new maximum Doppler frequency, i.e., $f_D+f_{OFO}$. Since the frequency shift due to the OFO is much larger than that due to the Doppler effect, the required number of subspaces or BEM basis functions will be increased significantly, leading to a high pilot overhead. Therefore, it is of great importance to estimate and compensate the OFO before implementing the OTFS channel estimators.

In accordance with a first aspect of the present invention, a two-dimensional arrangement of pilot symbols and data symbols of a dual-rate communication frame for an OTFS transmission system is proposed. The DP-part is carefully designed for an initial OFO estimation and a subsequent joint estimation of the channel and a residual OFO.

The communication frame comprises a first-type block and a second-type block. The first-type block comprises pilot signals, guard signals, and data signals, and the second-type block exclusively comprises data signals. The pilot symbols, guard signals, and data symbols of the first-type block, and the data symbols of the second-type block are arranged along the points of a grid in the delay-Doppler domain. The communication frame is characterized by a respective first-type block preceding and trailing, or following, a second-type block. In the first-type block at least one pilot symbol is surrounded on at least three sides by one or more guard symbols, and the points of the grid of the first-type blocks in the delay-Doppler domain that are not occupied by pilot symbols or guard symbols are used for data symbols.

FIG. 3A depicts an exemplary proposed dual-rate OTFS frame with DP. Two low-rate data and DP blocks are placed at the front and back of the OTFS frame along the delay dimension for OFO estimation. The low-rate data symbols are shown in diagonal cross-hashed pattern. The DP symbols are shown in black, with the guard symbols or guard spaces are shown in vertical and horizontal cross-hashed pattern. Note that the guard symbols are considered part of the pilot symbols, inter alia, for determining the pilot overhead. The required number of pilots for proper channel estimation preferably is at least (2Q+1) (2L+1), where Q is the BEM order (Q<<N) and L is the channel length. The dimension of the low-data rate blocks is 2N (L+1). The dimension of the pilot blocks nested within the low-data rate blocks is 2P (L+1), while P>=2Q+1. P is the number of pilot and guard symbols along the Doppler dimension and is selected in accordance with the maximum Doppler frequency. For example, given Q=2, L=5, N=16, the minimum required number of pilots for proper channel estimation is 5*11=55. The dimension of low-data rate blocks is 2*16*6=192, while the dimension of its pilot block is at least 2*5*6=60. Accordingly, since 60>55, no additional pilots in the high-rate block are needed, and the pilot-aided channel estimation can be carried out using only the pilots in the low-rate blocks. Using additional pilots in the high-rate blocks, however, is possible, for any reason. The dimension of high-rate data block, represented by the white boxes, is (M−2(L+1))N.

In FIG. 3A the DP symbol is preceded by two guard symbols. Due to the cyclic convolution processing in the receiver the guard symbols of the first-type block following the first-type block can be considered as trailing the DP symbol of the first-type block preceding the second-type block, thus the DP symbol is surrounded by guard symbols on both sides. This effect is shown in FIG. 3B. Here, the second low-rate block at the back of the high-rate block is folded to the front of the first low-rate block at the front of the high-rate block, and the leading guard spaces of the first low-rate block at the front of the high-rate block effectively become trailing guard spaces, as shown in the dashed box. Note that the distance between the two low-rate blocks is added for clarity only.

Providing two low-rate blocks, one at the front and one at the back of a high-rate block, permits determining the OFO in the receiver, all the while each of the low-rate blocks that carries DP symbols can be made smaller in the delay dimension, yet providing guard symbols properly surrounding the DP symbol. The benefit of being able to determine OFO in the receiver is, thus, achieved at no or only a small increase of the pilot overhead.

The length in the delay dimension of the high-rate block separating the low-rate blocks determines the OFO range that can be estimated. A shorter length of the high-rate block supports estimating a wider OFO range, but the estimation accuracy decreases.

It is noted that the DP symbols may have trailing guard symbols rather than leading guard symbols, as exemplarily shown in FIG. 3C. As explained before, due to the cyclic convolution processing in the receiver the guard symbols of the first-type blocks located at the front and back of the second-type block will surround the DP symbol at both sides in the same manner as discussed with reference to FIG. 3B.

In one or more embodiments of the communication frame at least the pilot and guard symbols in the first-type blocks preceding and following a second-type block are identical, e.g., with respect to their amplitudes and arrangement in the delay-Doppler-grid.

In one or more embodiments of the communication frame the number of guard symbols preceding and/or trailing the pilot symbol in the direction of the delay domain is twice the maximum time delay in terms of delay bins.

In accordance with a second aspect of the present invention, a transmitter of an OTFS transmission system comprises a signal mapper arranged upstream of a first transmitter-side transformation unit and a second transmitter-side transformation unit. The signal mapper is adapted to receive a binary data sequence and to output a two-dimensional arrangement of pilot symbols, guard symbols and data symbols of a communication frame in the delay-Doppler domain in accordance with the first aspect of the invention described hereinbefore. The first transmitter-side transformation unit is adapted to receive, at an input, the two-dimensional communication frame in the delay-Doppler domain that is output from the signal mapper, and to output a two-dimensional arrangement of information symbols in the time-frequency domain. The two-dimensional arrangement of information symbols in the time-frequency domain comprises and represents both, pilot and data symbols. The output of the first transmitter-side transformation unit is provided to an input of the second transmitter-side transformation unit, which is adapted to output a continuous time-domain signal representing the communication frame, for transmission over the communication channel.

In one or more embodiments the first transmitter-side transformation unit is adapted to perform a pre-coding and/or an inverse symplectic finite Fourier transform.

In one or more embodiments the second transmitter-side transformation unit is adapted to perform a Heisenberg transform or an inverse finite Fourier transform (IFFT).

In realistic scenarios, there is a constraint for the transmission power which covers both data and pilot transmission. Define $P_T$ as the total transmission power and $\alpha(\alpha \in (0, 1))$ as the data power allocation ratio. It suggests that $P_T$ and $(1-\alpha) P_T$ are used for transmitting data symbols and pilots, respectively. Typically, if more power is used for pilot transmission, i.e., $\alpha$ is small, the initial channel estimation performance would be better. However, less power would remain for data transmission, giving rise to low data signal-to-noise-ratio (SNR) and thus low reliability. Instead, the pilots allocated with less power, i.e., a is large, would lead to a poor initial channel estimate and signal estimate, which would not be a good starting point to implement the following refinement of channel estimation and equalization, resulting in low reliability as well. Therefore, a suitable power allocation between data and pilot is of utter importance in achieving high reliability.

Accordingly, in one or more embodiments the transmitter is arranged to assign between 50% and 99% of the total transmit power to data symbols, and the remaining transmit power to pilot symbols, preferably between 90% and 99%.

In one or more embodiments the transmitter is arranged to adapt the power assigned to data and pilot symbols, respectively, in dependence of a communication channel used, a carrier frequency used and/or a differential speed between transmitter and receiver. The adaptation may be dynamic for individual or groups of subsequent communication frames, e.g., if the communication channel, the carrier frequency and/or the differential speed between transmitter and receiver vary.

In one or more embodiments the signal mapper is arranged to adapt the pilot overhead in dependence of a communication channel used, a carrier frequency used, a maximum delay and/or a differential speed between transmitter and receiver. The adaptation may be dynamic for individual or groups of subsequent communication frames, e.g., if the communication channel, the carrier frequency and/or the differential speed between transmitter and receiver vary.

A static adaptation of the pilot overhead and/or the power allocation ratio in the transmitter may be based on an assumption that the communication channel used, the carrier frequency and/or the differential speed between transmitter and receiver is static or varies negligibly within tolerable limits. The static adaptation may also consider a worst-case scenario, e.g., a maximum expected or permitted differential speed between transmitter and receiver, a maximum expected delay or the like, while the receiver and the transmitter are communicatively connected, e.g., within radio range. The expected maximum differential speed may be provided by external input data, e.g., speed limits for mobile entities like cars or trains within a coverage area of a fixed transmitter.

A dynamic adaptation of the pilot overhead and/or the power allocation ratio in the transmitter may be based on an actual differential speed between transmitter and receiver. Such information may be provided from a receiver, e.g., a speed vector of the receiver, or on information available at the transmitter, e.g., a number of receivers that are within the range of the transmitter. In a stationary transmitter, e.g., a base station or the like, this number may correspond to the number of receivers currently or on average attached or in communicative connection with the transmitter. The dynamic adaptation may also be based on information received from a receiver such as channel status information, a bit error rate or a number of iterations of channel estimations required for decoding a previously received signal.

However, the power allocation and/or the pilot overhead may also be tweaked for special requirements. For example, in order to achieve a fast convergence performance in the receiver, the power allocation ratio $\alpha$ could be selected smaller than the one with equal data SNR and pilot SNR, and/or the BEM order of the first channel estimation unit may be larger than 1, resulting in a larger pilot overhead. Simulations have shown that a power allocation ratio around 95% is advantageous for maximising of both BER and convergence performance.

Dynamically finding a near-optimal power allocation for pilot and data signals ratio may be achieved by performing training prior to the start of an actual transmission. As was mentioned further above, an advantageous power allocation ratio may be found when the average data SNR and average pilot SNR are equal.

In accordance with a third aspect of the present invention, a receiver for an OTFS transmission system comprises a first receiver-side transformation unit and a second receiver-side transformation unit. The receiver is adapted to receive a time-domain signal representing a communication frame in accordance with claim 1 transmitted over a practical communication channel, i.e., a communication channel subject to Doppler spread, at an input of the first receiver-side transformation unit, which outputs a two-dimensional representation of the received communication frame in the time-frequency domain. The output of the first receiver-side transformation unit is provided to an input of the second receiver-side transformation unit, which outputs a two-dimensional representation of the received communication frame comprising pilot and data signals in the delay-Doppler domain. The receiver comprises an OFO estimator that is configured for performing an initial OFO estimation and compensation using symbols carried in the first-type block of the received communication frame, and further comprises an iterative two-stage channel estimation and equalization block that is configured for performing a joint estimation of a residual OFO and the communication channel based on all symbols carried in the received communication frame.

The first-type blocks of the communication frame preceding and trailing, respectively, the second-type block are located at L and (M−1), respectively, along the delay dimension. The OFO can then be estimated by exploiting the auto-correlation of two received first-type blocks of low-rate data and comprising DP in the front and back of OTFS frame, without the need for additional pilots.

Define $g_k = [y[k,L], y[k, M-1]]^T$.

The proposed OFO estimation comprises three steps as follows:
1) Auto-correlation matrix calculation: The correlation matrix R is computed by $$R = \frac{1}{N}\sum_{k=0}^{N-1} g_k g_k^H.$$

2) Eigenvalue decomposition: The Eigenvalue decomposition is implemented on R, and the signal eigenvector of length 2 is obtained as u.
3) OFO extraction: Define $u_1$ and $u_2$ as the first and the last element of u, respectively. Thanks to the constant phase shift property, $u_1$ and $u_2$ have the following relationship, $$u_2 = u_1 e^{j\frac{2\pi\Phi(M-L-1)}{M}}.$$

As a result, OFO can be easily estimated as:

$$\hat{\phi} = \frac{\angle\{u_1^\dagger u_2\}M}{2\pi(M-L-1)}.$$

Thus, the OFO is estimated with a closed-form solution and does not require additional pilots. Note that the complexity of OFO estimation process is 4N.

Accordingly, in accordance with one or more embodiments the initial OFO estimation includes exploiting the auto-correlation of the received OTFS symbols carried in the first-type blocks of the received communication frame, corresponding to low-rate data and DP. The initial OFO compensation comprises providing the initial OFO estimate to the iterative two-stage channel estimation and equalization block, for incorporating with the BEM basis functions used for the channel estimation.

By incorporating the OFO estimate $\hat{\phi}$ into the GCE-BEM basis function $b_q$, the new GCE-BEM basis function is obtained as $$\hat{b}_{OFO,q} = \text{diag}\left\{\left[1, e^{\frac{2\pi\hat{\phi}}{M}}, \ldots, e^{\frac{2\pi\hat{\phi}(MN-1)}{M}}\right]\right\}b_q.$$

By taking into account (Q+1) BEM basis functions, the OFO compensation method has the linear complexity of MN(Q+1). Thus, the system model presented further above can be remodeled to $$y = \sum_{q=0}^{Q}(F_N \otimes I_M)\text{diag}\{\hat{b}_{OFO,q}\}F_{MN}^H\text{diag}\{F_{MN\times L}c_q\}F_{MN}(F_N^H \otimes I_M)x + z_{mod} + w.$$

After the initial OFO estimation and compensation, due to the BEM modeling error and noise, a small residual OFO remains, which will be addressed in the joint estimation of the residual OFO and the communication channel.

In accordance with one or more embodiments the joint estimation of the remaining OFO and the channel uses an iterative two-stage channel estimation implementing an initial channel estimation followed by an initial equalization and symbol estimation, and an iterative channel estimation followed by respective equalization and symbol estimation.

In accordance with one or more embodiments at least the pilot signals output from the second receiver-side transformation unit are provided to a first channel estimation unit, which outputs a first estimation of the time-domain channel matrix $\hat{H}_t^{i=0}$. The first estimation of the time-domain channel matrix $\hat{H}_t^{i=0}$, as well as at least the data signals output from the second receiver-side transformation unit or the pilot and data signals output from the second receiver-side transformation unit, are provided to an equalizer unit, which outputs an estimated set of at least data signals. The estimated set of at least data signals, as well as at least the pilot signals output from the second receiver-side transformation unit or the pilot and data signals output from the second receiver-side transformation unit, are provided to a second channel estimation unit, which outputs a second estimation of the time-domain channel matrix $\hat{H}_t^{i\geq 1}$. The output $\hat{H}_t^{i\geq 1}$ of the second channel estimation unit, as well as at least the data signals output from the second receiver-side transformation unit or the pilot and data signals output from the second receiver-side transformation unit, are provided to the equalizer unit, which outputs a further estimated set of at least data signals. The channel estimation in the second channel estimation unit and estimating an estimated set of at least data signals in the equalizer unit is iteratively repeated until a termination criterion is met. In other words, the process of estimating the time-domain channel matrix $\hat{H}_t^i$ in the second channel estimation unit and estimating sets of at least data symbols in the equalizer unit, feeding back the respective latest output from the equalizer unit, as well as at least the pilot signals output from second receiver-side transformation unit or the pilot and data signals output from the second receiver-side transformation unit, to the second receiver-side channel estimation unit, are repeated until the termination criterion is met.

Termination criteria may include convergence of the outputs of the equalizer unit. Such convergence may be assumed, e.g., when the bit error rate of the decoded output of the equalizer unit for two subsequent iterations is below a predetermined threshold. The threshold may be, e.g., a difference in bit error rates that is smaller than $10^{-6}$. Another conceivable termination criterion may be a predetermined number of iterations. It is also possible to set a maximum number of iterations after which the iteration is terminated, but to terminate the iteration earlier when the bit error rate for two subsequent iterations lies below the predetermined threshold before the maximum number of iterations is reached.

In one or more embodiments of the receiver the first receiver-side transformation unit is adapted to perform a finite Fourier transform, an inverse Heisenberg-, or Wigner-transform.

In one or more embodiments of the receiver the second receiver-side transformation unit is adapted to perform a symplectic finite Fourier transform.

In one or more embodiments of the receiver the first channel estimation unit is adapted to perform a channel estimation based on a basis expansion modelling of a first BEM order of the time-varying communication channel. The first BEM order refers to the order of basis expansion for modelling the communication channel. The first channel estimation preferably is a pilot-aided channel estimation, i.e., uses the known locations and/or other properties of the pilot signals in the communication frame for estimating.

In one or more embodiments of the receiver the equalizer performs a message passing, a zero-forcing and/or a minimum mean square error equalization.

In one or more embodiments of the receiver the second channel estimation unit is adapted to perform a channel estimation based on a basis expansion modelling of a second BEM order of the time-varying communication channel. The second BEM order refers to the order of basis expansion for modelling the communication channel. The second channel estimation preferably is a data-aided channel estimation, i.e., uses the signals estimated in the equalizer unit in addition to the pilot signals in the communication frame for estimating.

The first and the second BEM orders of the first and second channel estimation units may be the same or different. It is noted that a small BEM order Q and a lower BEM resolution T may be used when a low pilot overhead is required. However, a small BEM order typically results in a slower convergence. A higher BEM order with a higher resolution result in a superior performance and faster convergence, but may require more pilots, i.e., have a higher pilot overhead. For example, when the BEM order is increased from Q=2 to Q=4, the resolution T may advantageously be increased from 1 to 2.

Thanks to the estimation of the transmitter's OFO in the receiver the residual OFO is comparatively small. This allows for using a small BEM order Q and a small resolution T in the initial, pilot-aided channel estimation, while still achieving fast convergence.

One or more embodiments of the receiver further comprise a control unit that is adapted to receive information about the absolute speed and direction of the receiver over ground, the absolute speed and direction of the transmitter over ground and/or the relative speed between the receiver and the transmitter, and is further adapted to determine a BEM order $Q_S$, and/or is adapted to receive the BEM order $Q_S$ used at the transmitter for composing the communication frame. The received or determined BEM order $Q_S$ and/or the received information is passed to the first and/or second channel estimation unit, for determining the respective order of BEM to be applied or used. Information about the BEM order $Q_S$ used at the transmitter may be transmitted, e.g., when a mobile terminal attaches to a base station, or more generally, when a communication connection between a transmitter and a receiver is established. As only a few bytes are needed this would not significantly reduce the overhead, but may actually increase the spectral efficiency in case a smaller overhead than a default overhead can be used.

If no dynamic adaptation of the BEM order $Q_S$ is used, the receiver may assume a stipulated default value.

The various elements of the transmitter and the receiver presented above may be implemented in hardware, as software modules, or combinations thereof, i.e., hardware that is controlled and/or parameterized through software. In particular, the first and second channel estimation units of the receiver may rely on the same hardware or software module, and may be parameterized for the respective pilot-aided or data-aided channel estimation, using respective input data and GCE-BEM parameters.

A wireless device in accordance with a fourth aspect of the present invention comprises a transmitter and/or a receiver for an OTFS transmission system as described hereinbefore.

In accordance with a fifth aspect of the present invention, a method of transmitting a binary data sequence over an OTFS communication channel comprises mapping, in a signal mapper, a binary data sequence into a two-dimensional arrangement of pilot symbols and data symbols along the points of a grid in the delay doppler domain. In the two-dimensional arrangement according to an aspect of the invention the number of guard symbols surrounding the pilot symbol in each direction of the Doppler domain is twice the number of the BEM basis functions used for modelling the communication channel in a receiver. The signal mapper may provide a number of guard symbols around the pilot symbol in each direction of the delay domain that is twice the maximum time delay in terms of delay bins. The two-dimensional arrangement forms a communication frame for an OTFS transmission system. Mapping may include receiving the binary data sequence at an input of the signal mapper and providing the two-dimensional arrangement of pilot and data symbols at an output of the signal mapper.

The method further comprises transforming, in a first transmitter-side transformation unit, the two-dimensional communication frame in the delay-Doppler domain into a two-dimensional arrangement of information symbols in the time-frequency domain. The first transformation may include receiving the two-dimensional communication frame in the delay-Doppler domain at an input of the first transmitter-side transformation unit and providing the two-dimensional arrangement of information symbols at an output of the first transmitter-side transformation unit.

The method yet further comprises transforming, in a second transmitter-side transformation unit, the two-dimensional arrangement of information symbols into a continuous time-domain signal representing the communication frame. The second transformation may include receiving the two-dimensional arrangement of information symbols in the time-frequency domain at an input of the second transmitter-side transformation unit and providing the continuous time-domain signal representing the communication frame at an output of the second transmitter-side transformation unit.

The method further comprises transmitting the continuous time-domain signal representing the communication frame over the communication channel. Transmitting may include steps known from conventional transmitters such as amplifying, beam-forming and -directing and the like.

In one or more embodiments of the method, the first transforming step comprises subjecting the two-dimensional communication frame in the delay-Doppler domain to an inverse symplectic finite Fourier transform.

In one or more embodiments of the method, the second transforming step comprises subjecting the two-dimensional arrangement of information symbols to a Heisenberg transform or an inverse finite Fourier transform (IFFT).

In one or more embodiments the method further comprises setting a power allocation ratio between data and pilot symbols between 0.5 and 0.99, preferably between 0.9 and 0.99.

In one or more embodiments the method further comprises adapting a power allocation ratio between data and pilot symbols in dependence of a communication channel used, a carrier frequency used and/or a differential speed between transmitter and receiver.

In one or more embodiments the method further comprises adapting the pilot overhead in dependence of a communication channel used, a carrier frequency used and/or a differential speed between transmitter and receiver.

In accordance with a sixth aspect of the present invention, a method of receiving a binary data sequence over a practical OTFS communication channel comprises receiving a continuous time-domain signal representing a communication frame in accordance with the first aspect of the invention over the communication channel. The method further comprises transforming, in a first receiver-side transformation unit, the continuous time-domain signal representing the communication frame into a two-dimensional arrangement of information symbols in the time-frequency domain that is available at an output of the first receiver-side transformation unit. In a next step of the method the two-dimensional arrangement of information symbols comprising pilot and data signals in the time-frequency domain is transformed, in a second receiver-side transformation unit, into a two-dimensional communication frame comprising pilot and data signals in the delay-Doppler domain, which is made available at an output of the second receiver-side transformation unit. Next, an OFO is estimated from the first-type blocks of the communication frame, which OFO is provided to a channel estimation unit, for incorporating the OFO estimate into the CE function applied.

For obtaining a first estimation of the time-domain channel matrix $\hat{H}_t^{i=0}$ at an output of a first channel estimation unit at least the pilot signals comprised in the two-dimensional communication frame in the delay-Doppler domain are provided to a first channel estimation unit. The first estimation of the time-domain channel matrix $\hat{H}_t^{i=0}$, as well as at least the data signals output from the second receiver-side transformation unit or the pilot and data signals output from the second receiver-side transformation unit, are then provided to an equalizer unit, for obtaining an estimated set of at least data signals at an output of the equalizer unit. Next, the estimated set of at least data signals that are output from the equalizer unit, as well as at least the pilot signals available after the second transformation in the second receiver-side transformation unit or the pilot and data signals output from the second receiver-side transformation unit, are provided to a second channel estimation unit, for estimating a further estimation of the time-domain channel matrix $\hat{H}_t^{i=1}$. The further estimation of the time-domain channel matrix $\hat{H}_t^{i=1}$ available at an output of the second channel estimation unit, as well as at least the data signals obtained after the second transformation in the second receiver-side transformation unit or the pilot and data signals output from the second receiver-side transformation unit, are then provided to the equalizer unit, for obtaining a further estimated set of at least data signals. Estimating the time-domain channel matrix $\hat{H}_t^{i=1}$ in the second channel estimation unit and estimating sets of at least data signals in the equalizer unit is iteratively repeated until a termination criterion is met. In the iterative repetition, the respective latest further estimated set of at least data signals and the pilot signals are used for estimating the time-domain channel matrix $\hat{H}_t^{i=1}$, and the respective latest estimated time-domain channel matrix $\hat{H}_t^{i=1}$, as well as at least the data signals obtained after the second transformation in the second receiver-side transformation unit or the pilot and data signals output from the second receiver-side transformation unit, are used for the next estimation of at least data signals.

In one or more embodiments of the method, transforming the continuous time-domain signal representing the communication frame into a two-dimensional arrangement of information symbols in the time-frequency domain comprises subjecting the continuous time-domain signal representing a communication frame to a finite Fourier transform, an inverse Heisenberg-, or Wigner-transform.

In one or more embodiments of the method, transforming the two-dimensional arrangement of information symbols comprising pilot and data signals in the time-frequency domain into a two-dimensional communication frame comprising pilot signals and data signals in the delay-Doppler domain comprises subjecting the two-dimensional arrangement of information symbols comprising pilot and data signals in the time-frequency domain to a symplectic finite Fourier transform.

In one or more embodiments of the method, estimating the OFO from the first-type blocks comprises separating the first-type blocks from the received communication frame, performing an auto-correlation at least on the pilot symbols contained therein, and extracting the OFO information from the autocorrelation.

In one or more embodiments of the method, obtaining the first estimation of the time-domain channel matrix $\hat{H}_t^{i=0}$ comprises performing a channel estimation based on a basis expansion modelling of the time-varying communication channel of a first BEM order.

In one or more embodiments of the method, estimations of the time-domain channel matrix $\hat{H}_t^{i=1}$ in the second channel estimation unit comprises performing a channel estimation based on a basis expansion modelling of the time-varying communication channel of a second BEM order.

As mentioned further above, the first and the second BEM orders Q, and/or the resolutions T of the first and second channel estimation units, respectively, may be the same or different.

In one or more embodiments of the method, obtaining an estimated set of at least data signals in the equalizer unit comprises subjecting at least the data signals obtained after the second transformation in the second receiver-side transformation unit to a message passing, a zero-forcing and/or a minimum mean square error equalization.

In one or more embodiments the method further comprises receiving, in a control unit, information about the absolute speed and direction of the receiver over ground, the absolute speed and direction of the transmitter over ground and/or the relative speed between the receiver and the transmitter, and determining a BEM order $Q_S$. and/or receiving the BEM order $Q_S$ used at the transmitter for composing the communication frame. The received information may be used for determining the respective BEM order to be used in the first and/or in the second channel estimation unit. The respective received or determined BEM order is provided to the first and/or to the second channel estimation unit.

The methods of transmitting and/or receiving may be represented by computer program instructions which, when executed by a microprocessor, cause the computer and/or control hardware components of a transmitter or a receiver of an OFTS transmission system as presented hereinbefore, respectively, to execute the method of transmitting or receiving as presented hereinbefore, respectively.

The computer program instructions may be retrievably stored or transmitted on a computer-readable medium or data carrier. The medium or the data carrier may by physically embodied, e.g., in the form of a hard disk, solid state disk, flash memory device or the like. However, the medium or the data carrier may also comprise a modulated electromagnetic, electrical, or optical signal that is received by the computer by means of a corresponding receiver, and that is transferred to and stored in a memory of the computer.

XOs with a very small OFO are typically more expensive and require more power to operate. The proposed communication frame, in a transmitter and receiver executing the respective methods according to an aspect of the invention, permits handling the larger OFO of less expensive XOs having larger OFO at lower power requirements and, thus, also permits reducing the power consumption while at the same time reducing the equipment cost.

The proposed TFDR-OTFS receiver achieves excellent performance in terms of bit error rate (BER), mean-square-error (MSE) of OFO estimation, and MSE of channel estimation while having low pilot overhead, thanks to the careful design of the communication frame with first- and second-type blocks, the first-type blocks offering low-rate data rate and DP. Its BER performance is close to the BER lower bound which assumes the perfect estimation and compensation of OFO and channel.

The proposed communication frame and its DP pattern serves two purposes: first estimating OFO together with low-rate data, and then estimating OTFS channel, and thus, saving more resources for high-rate data. By utilizing low-rate data and carefully designing their positions, OFO is estimated without requiring additional dedicated pilots. By estimating and compensating OFO before channel estimation, the dedicated pilot overhead is reduced significantly.

BRIEF DESCRIPTION OF THE DRAWING

In the following section exemplary embodiments of the invention will be described in greater detail with reference to the drawing. In the drawing.

Throughout the figures identical or similar elements may be referenced using the same reference designators.

DETAILED DESCRIPTION OF EMBODIMENTS

FIGS. 1 to 3C have been described further above and will not be discussed again.

Figure 4:
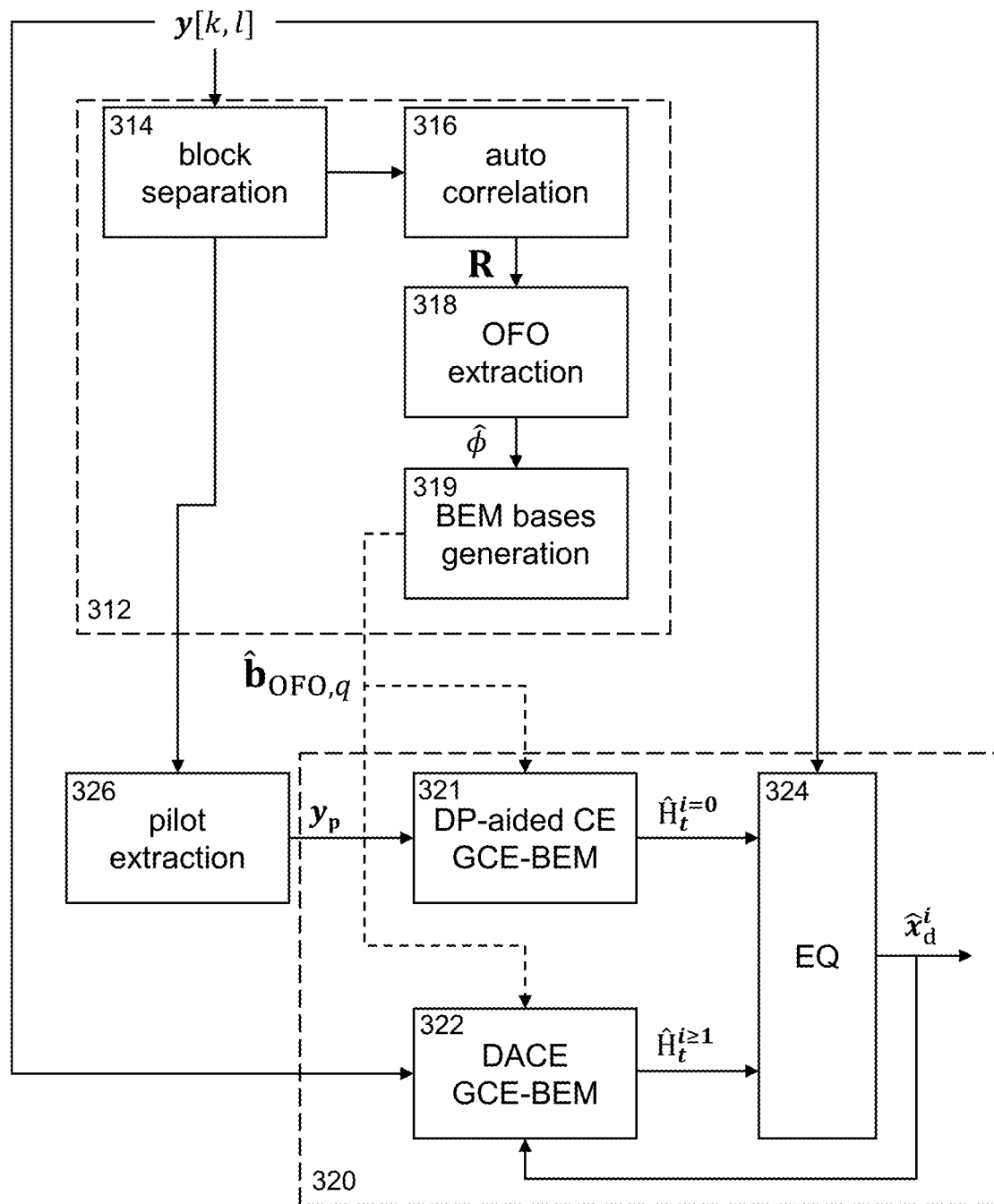
FIG. 4 shows a block diagram of the OFO estimation, channel estimation and equalization of an exemplary receiver in accordance with an aspect of the present invention.

FIG. 4 shows a schematic block diagram of the initial OFO estimation and compensation and the joint residual OFO and channel estimation in an exemplary receiver 300 in accordance with an aspect of the present invention. After executing the SFFT and Wigner transforms, the received symbols in the delay-Doppler domain y[k, l] are available for further processing.

Figure 1:
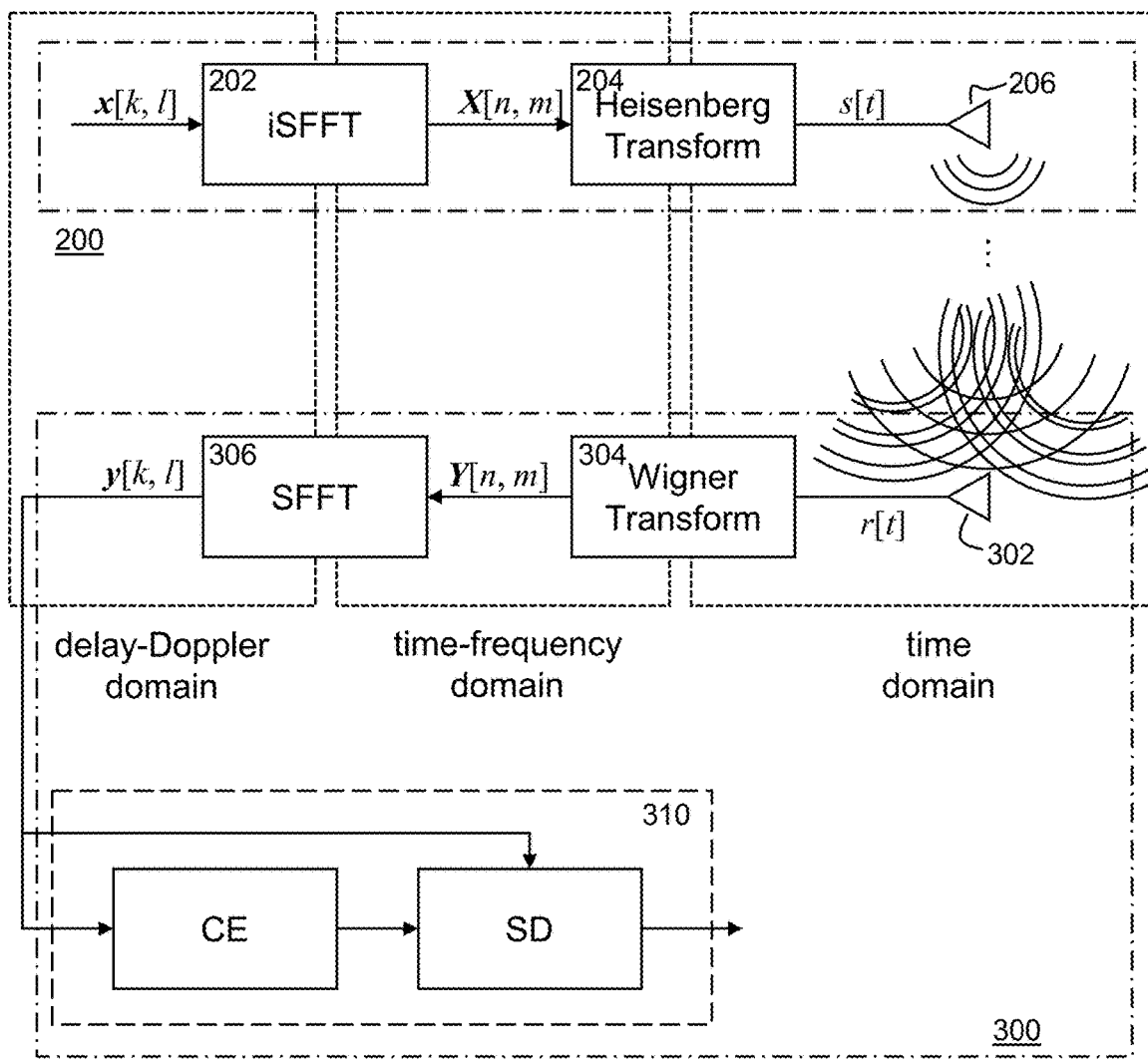
FIG. 1 shows a block diagram of a general OTFS transmission system.
Figure 2:
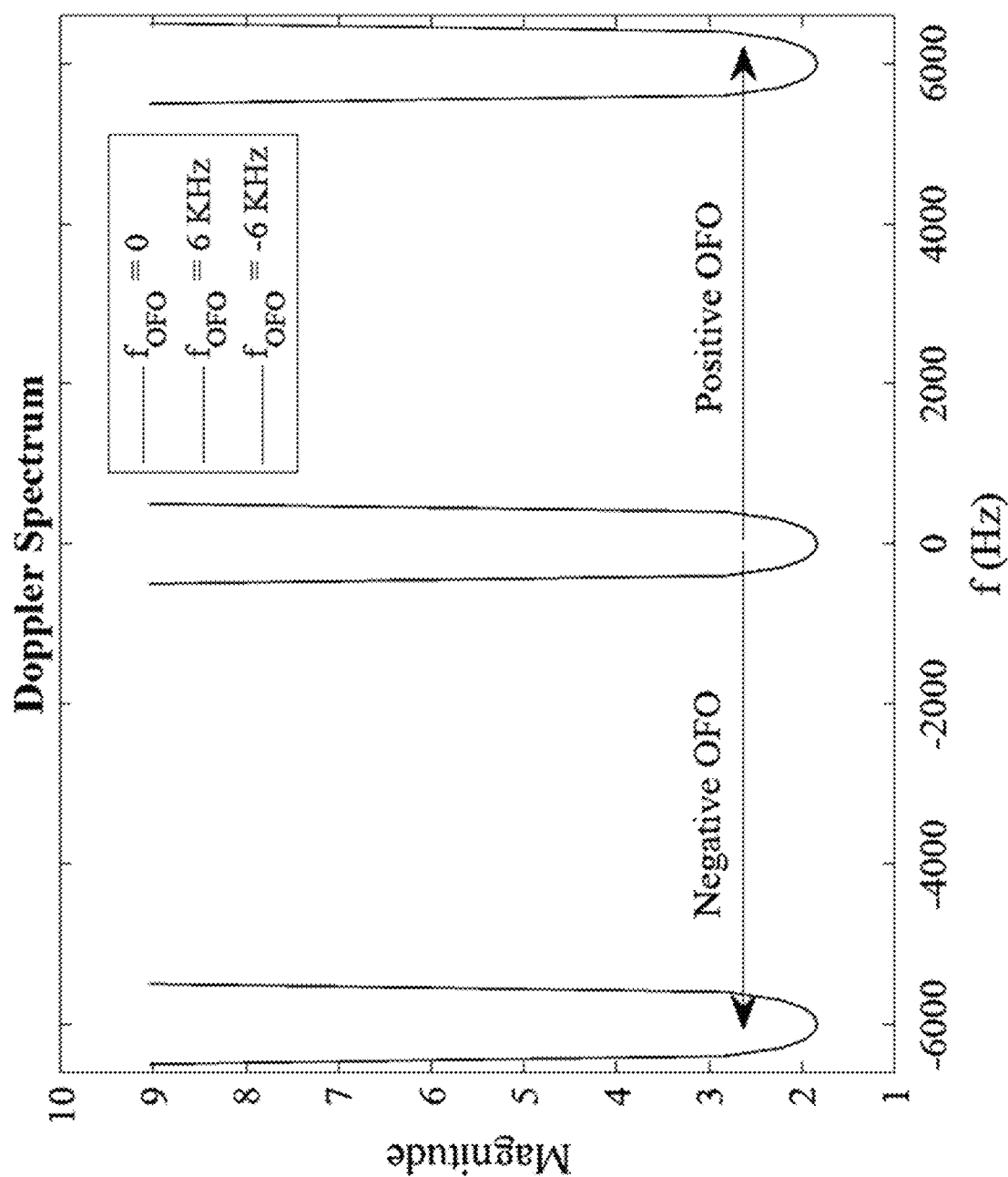
FIG. 2 shows an exemplary visualisation of the Doppler spectrum shifts in an OTFS communication channel in the presence of OFO.
Figure 3A:
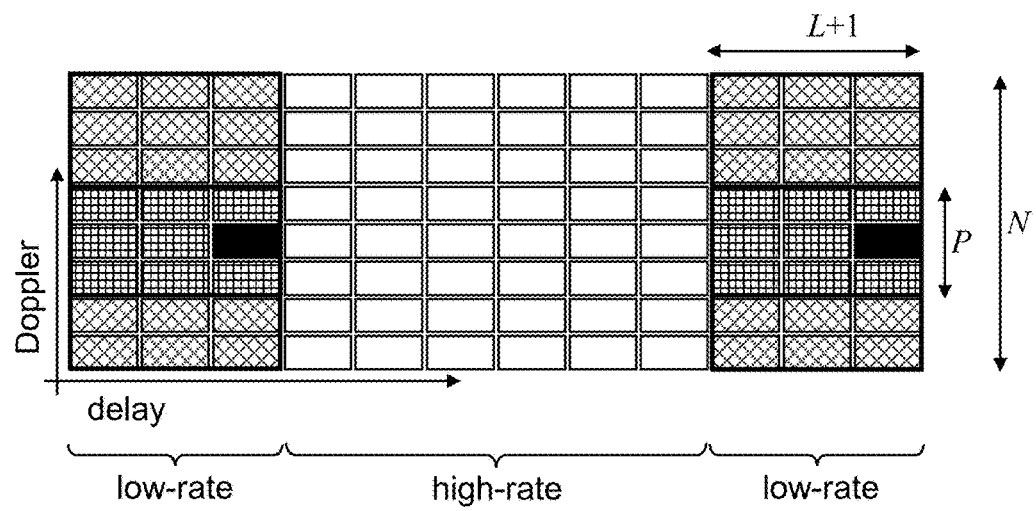
FIGS. 3A-3C depict exemplary OTFS frame patterns according to an aspect of the present invention at the transmitter.
Figure 3B:
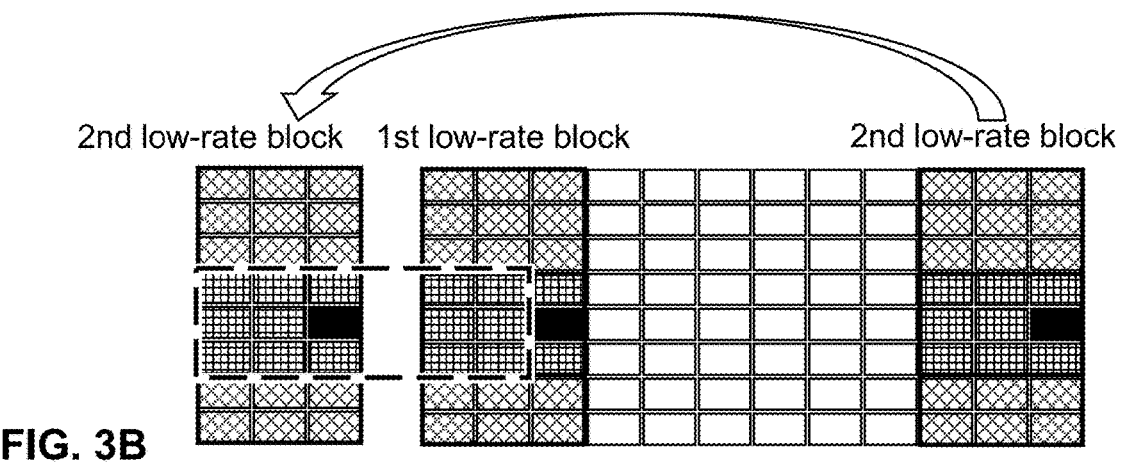
Figure 3C:
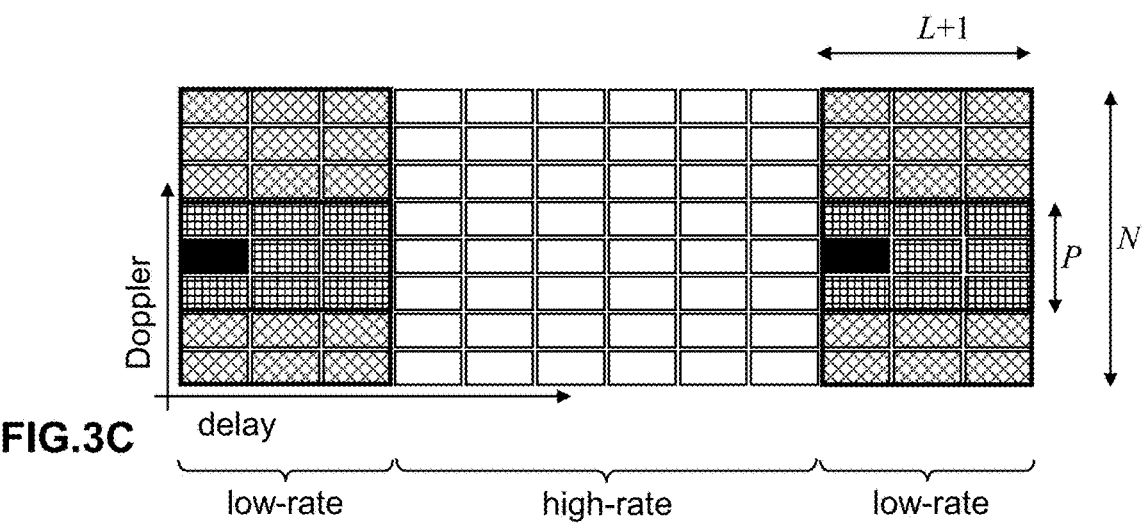

The OFO estimation 312, channel estimation 321, 322 and equalization 324 replace the generic channel estimation and equalization block 310 shown in FIG. 1. All other elements of the receiver 300 shown in FIG. 1, i.e., first and second receiver-side transformation units 304 and 306, respectively, are identical and are not shown in the figure.

The two-dimensional arrangement of pilot and data signals y[k, l] in the delay-Doppler domain output from the second receiver-side transformation unit 306 may first be provided to the OFO estimator unit 312. OFO estimator unit 312 comprises a block separation unit 314, which separates the first-type blocks from the second-type blocks of the communication frame, and provides the first-type blocks to an autocorrelation unit 316. The autocorrelation may include or be followed by an Eigenvalue decomposition (not shown in the figure). The result of the autocorrelation is provided to the OFO extraction unit 318, which determines the OFO and provides it to a BEM bases generation unit 319. Based on the OFO estimate § output from the OFO extraction unit 318 BEM bases generation unit 319 determines the BEM orders Q to be used in the channel estimation units 321 and 322, and forwards corresponding information accordingly to the first and second channel estimation units 321, 322.

The two-dimensional arrangement of pilot and data signals y[k, l] in the delay-Doppler domain output from the low-rate block extraction unit 314 may also be provided to a pilot extraction unit 326, which is essentially a windowing function that uses the knowledge of the construction of the transmitted two-dimensional array for removing or suppressing data signals. The extracted pilot signals yp are provided to a first channel estimation unit 321, which performs a pilot-aided, OFO-included first channel estimation using a GCE-BEM channel model with a first BEM order $Q_S$. The first BEM order $Q_S$ may be small, using a low-resolution T, e.g., if a low pilot overhead is required, albeit at the cost of a slower convergence. However, the first BEM order $Q_S$ may also be rather large, using a higher resolution T, resulting in a faster convergence, albeit at the cost of a higher pilot overhead The result of the channel estimation in the first channel estimation unit 321 is provided to an equalizer 324, together with at least the received data signals ya available at the second receiver-side transformation unit 306 or the entire received two-dimensional arrangement of pilot and data signals y[k, l]. The first estimation of the transmitted symbols is fed back to a second channel estimation unit 322, which outputs a data-aided, OFO-included channel estimation using a GCE-BEM channel model. The second channel estimation unit may use a higher BEM order QL and a higher resolution T than the first channel estimation unit, although same BEM orders QL and resolutions T are also conceivable. The second channel estimation unit 322 also receives the received two-dimensional arrangement of pilot and data signals y[k, l]. The result of the channel estimation in the second channel estimation unit 322 is provided to equalizer 324, together with at least the received data signals ya available at the second receiver-side transformation unit 306 or the entire received two-dimensional arrangement of pilot and data signals y[k, l], for obtaining an estimation of the transmitted symbols that is improved over the previous one. The process is repeated until the termination criterion is fulfilled.

Figure 5:
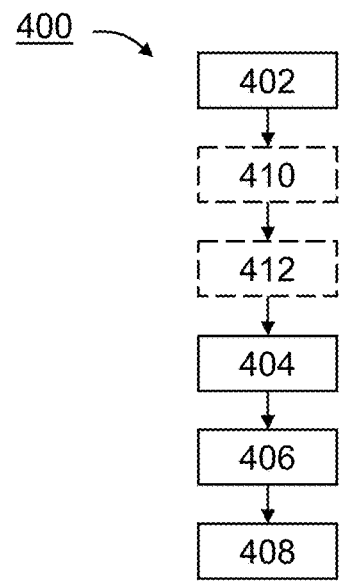
FIG. 5 shows a flow diagram of a method of transmitting a binary data sequence over an OTFS communication channel.

FIG. 5 shows a flow diagram of a method 400 of transmitting a binary data sequence over an OTFS communication channel. In step 402 a binary data sequence is mapped into a two-dimensional communication frame in the delay-Doppler domain, comprising a first-type block and a second-type block, in accordance with the first aspect of the invention. In step 404 the two-dimensional communication frame in the delay-Doppler domain is transformed into a two-dimensional arrangement of information symbols in the time-frequency domain. In step 406 the two-dimensional arrangement of information symbols in the time-frequency domain is transformed into a continuous time-domain signal representing the communication frame, which is transmitted over the channel in step 408. Prior to transforming the two-dimensional arrangement of information symbols in the delay-Doppler domain into a two-dimensional arrangement of information symbols in the time-frequency domain a power allocation ratio between pilot and data signals and/or a pilot overhead may be determined or adapted in optional step 410, which is set in optional step 412.

Figure 6:
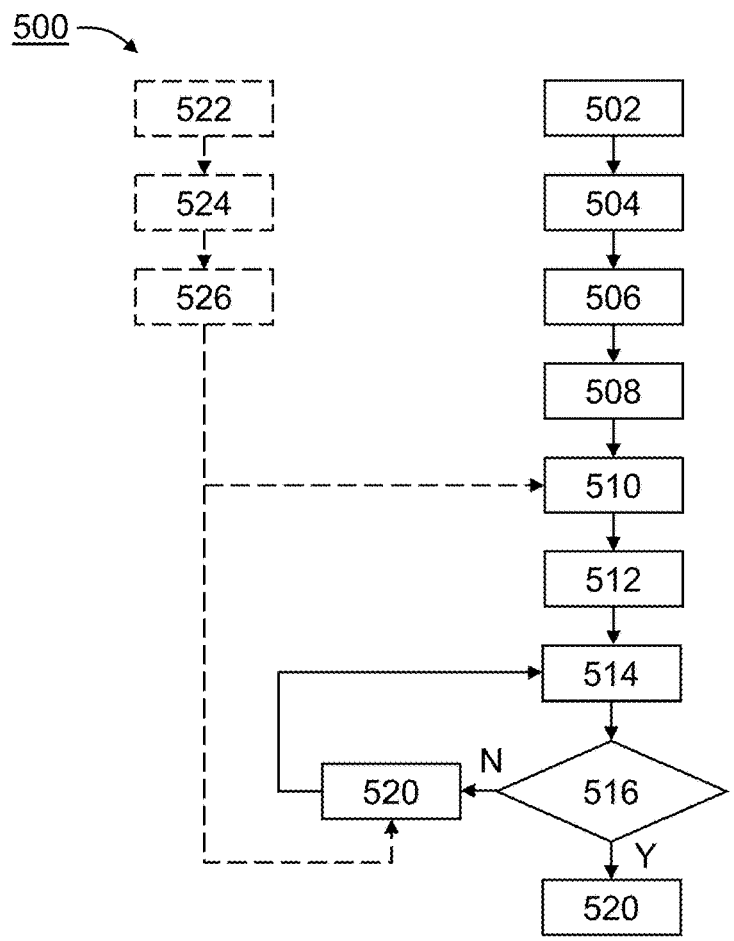
FIG. 6 shows a flow diagram of a method of receiving a binary data sequence over an OTFS communication channel susceptive to doubly-selective fading.

FIG. 6 shows a flow diagram of a method 500 of receiving a binary data sequence over an OTFS communication channel susceptive to doubly-selective fading. In step 502 a continuous time-domain signal representing a communication frame is received over the communication channel. In step 504 the continuous time-domain signal representing the communication frame is transformed into a two-dimensional arrangement of information symbols in the time-frequency domain. In step 506 the two-dimensional arrangement of information symbols comprising pilot and data signals in the time-frequency domain is transformed into a two-dimensional communication frame the delay-Doppler domain, comprising a first-type block and a second-type block, in accordance with the first aspect of the invention. In step 508 an OFO from the first-type blocks of the communication frame is estimated and provided, in step 510, from an OFO estimator 312 to a channel estimation unit 320. In step 512 an initial estimation of a time-domain channel matrix is obtained in a first channel estimation unit 321 that performs a channel estimation based on a basis expansion modelling of the time-varying communication channel of a first BEM order and at a first resolution. In step 514 an estimated set of at least data signals is determined in an equalizer unit 324, based on the channel estimation and the communication frame in the delay-Doppler domain. Step 516 checks if a termination criterion is met, which in the positive case, "Yes"-branch of step 516, signals that the estimated received symbols can be output to a de-mapper, in step 520, and ultimately can be output as a received binary sequence. If the termination criterion is not met, "No"-branch of step 516, a further estimation of a time-domain channel matrix is obtained, in step 520, in a second channel estimation unit 322 that performs a channel estimation based on a basis expansion modelling of the time-varying communication channel of a second BEM order and at a second resolution, using the estimated data signals in addition to the pilot signals. The result of the channel estimation is provided to the equalizer 324, which repeats step 514 using the further estimation from step 520.

Optionally, in step 522, a BEM order $Q_S$ that was used in the transmitter may be received, or information permitting determining a BEM order to be used in the channel estimation. In step 524 the BEM order $Q_S$ to be used is determined, and provided to the channel estimation unit in step 526.

DEFINITIONS AND LIST OF REFERENCE
NUMERALS (PART OF THE DESCRIPTION)

$f_c$ carrier frequency
$\Delta f$ subcarrier spacing
L channel length
M number of delay bins
N number of Doppler bins
$P_T$ total transmission power
$\alpha$ data power allocation ratio
$\lambda$ pilot overhead
$Q_S$ BEM order in the initial, low-order channel estimation
$Q_L$ BEM order in the subsequent, iterative channel estimation
AWGN additive white Gaussian noise
BEM basis expansion model
CE-BEM complex exponential BEM
GCE-BEM generalized CE-BEM DFT discrete Fourier transform
MSE mean square error
OTFS orthogonal time frequency space
SNR signal-to-noise-ratio
BER bit error rate
OFDM orthogonal frequency division multiplexing
MP message passing
SFFT finite symplectic Fourier transform
200 transmitter
202 first transmitter-side transformation unit
204 second transmitter-side transformation unit
206 antenna
300 receiver
302 antenna
304 first receiver-side transformation unit
306 second receiver-side transformation unit
310 channel estimation and equalization block
312 OFO estimator
314 low-rate block extraction
316 auto correlation
318 OFO extraction
319 OFO-included BEM bases generation
320 two-stage CE and EQ
321 first channel estimation unit
322 second channel estimation unit
324 equalizer unit
326 pilot extraction unit
400 method of transmitting
402 mapping to delay-Doppler domain
404 transform to time-frequency domain
406 transform to continuous time-domain signal
408 transmit over channel
410 adapting power allocation/pilot overhead
412 setting power allocation/pilot overhead
500 method of receiving
502 receiving continuous time-domain signal
504 transforming continuous time-domain signal into a two-dimensional arrangement of information symbols in the time-frequency domain
506 transforming a two-dimensional arrangement of information symbols in the time-frequency domain into a two-dimensional communication frame in the delay-Doppler domain
508 estimating OFO
510 providing estimated OFO to a BEM bases generation unit and the generated BEM bases to the channel estimation
512 estimating time-domain channel matrix in a first channel estimation unit
514 estimating symbols
516 termination criterion met?
518 estimating time-domain channel matrix in a second channel estimation unit
520 output estimation to de-mapper
522 receiving
524 determining BEM to be used
526 providing BEM to channel estimation unit

The invention claimed is:

1. A two-dimensional arrangement of pilot symbols and data symbols of a communication frame for an Orthogonal Time Frequency Space (OTFS) transmission system,
wherein the communication frame comprises first-type blocks and a second-type block, wherein the first-type blocks are a lower rate than the rate of the second-type block, and wherein the first-type blocks comprises pilot signals, guard signals, and data signals, the second-type block exclusively comprising data signals, the method comprising
arranging the pilot symbols, the guard signals, and the data symbols of the first-type blocks, and the data symbols of the second-type block along points of a grid in a delay-Doppler domain;
configuring the communication frame such that a first-type block of the first-type blocks is followed by a second-type block, and a second-type block is followed by another first-type block of the first-type blocks,
wherein, in the first-type blocks, at least one pilot symbol is surrounded on at least three sides by one or more guard symbols, and
wherein the points of the grid of the first-type blocks in the delay-Doppler domain that are not occupied by pilot symbols or guard symbols are used for data symbols.

2. The method of claim 1, wherein the pilot and guard symbols in the first-type block and the another first-type block are identical.

3. The method of claim 1, wherein the number of guard symbols preceding and/or trailing the pilot symbol in the direction of the delay domain is twice the maximum time delay in terms of delay bins.

4. A transmitter of an OTFS transmission system comprising a signal mapper, a first transmitter-side transformation unit and a second transmitter-side transformation unit, wherein the signal mapper arranged upstream of the first transmitter-side transformation unit and the second transmitter-side transformation unit,
wherein the signal mapper is adapted to receive a binary data sequence and to output a two-dimensional communication frame in the delay-Doppler domain in which pilot symbols, data symbols and guard symbols are arranged in accordance with method of claim 1,
wherein the first transmitter-side transformation unit is adapted to receive, at an input, the two-dimensional communication frame in the delay-Doppler domain that is output from the signal mapper, and to output a two-dimensional arrangement of information symbols in the time-frequency domain, and
wherein the output of the first transmitter-side transformation unit is provided to an input of the second transmitter-side transformation unit, which is adapted to output a continuous time-domain signal representing the communication frame, for transmission over the communication channel.

5. The transmitter of claim 4, wherein the first transmitter-side transformation unit is adapted to perform a pre-coding and/or an inverse symplectic finite Fourier transform, and/or wherein the second transmitter-side transformation unit is adapted to perform a Heisenberg transform or an inverse finite Fourier transform.

6. The transmitter of claim 4, wherein the transmitter is arranged to assign between 50% and 99% of the total transmit power to data symbols, and the remaining transmit power to pilot symbols, preferably between 90% and 99%.

7. The transmitter of claim 4, wherein the transmitter is arranged to adapt a power assigned to data and pilot symbols, respectively, in dependence of a communication channel used, a carrier frequency used and/or a differential speed between transmitter and receiver.

8. The transmitter of claim 4, wherein the signal mapper is arranged to adapt the pilot overhead in dependence of a communication channel used, a carrier frequency used and/or a differential speed between transmitter and receiver.

9. A wireless device for an OTFS transmission system comprising a transmitter according to claim 4.

10. A method of transmitting a binary data sequence over an OTFS communication channel, comprising:
- mapping, in a signal mapper, a binary data sequence into a two-dimensional communication frame in the delay-Doppler domain in accordance with claim 1;
- transforming, in a first transmitter-side transformation unit, the two-dimensional communication frame in the delay-Doppler domain into a two-dimensional arrangement of information symbols in the time-frequency domain;
- transforming, in a second transmitter-side transformation unit, the two-dimensional arrangement of information symbols in the time-frequency domain into a continuous time-domain signal representing the communication frame; and
- transmitting the continuous time-domain signal representing the communication frame over the communication channel.

11. The method of claim 10, wherein the first transforming step comprises subjecting the two-dimensional communication frame in the delay-Doppler domain to an inverse symplectic finite Fourier transform, and/or wherein the second transforming step comprises subjecting the two-dimensional arrangement of information symbols to a Heisenberg transform or an inverse finite Fourier transform.

12. The method of claim 10, further comprising setting a power allocation ratio between data and pilot symbols between 0.5 and 0.99, preferably between 0.9 and 0.99.

13. The method of claim 10, further comprising adapting a power allocation ratio between data and pilot symbols in dependence of a communication channel used, a carrier frequency used and/or a differential speed between transmitter and receiver.

14. The method of claim 10, further comprising adapting the pilot overhead in dependence of a communication channel used, a carrier frequency used and/or a differential speed between transmitter and receiver.

15. A non-transitory computer readable medium storing a program product comprising computer program instructions which, when executed by a microprocessor, cause the computer and/or control hardware components of a transmitter of an Orthogonal Time Frequency Space (OTFS) transmission system comprising:
- a signal mapper arranged upstream of a first transmitter-side transformation unit and a second transmitter-side transformation unit,
- wherein the signal mapper is adapted to receive a binary data sequence and to output a two-dimensional communication frame in a delay-Doppler domain in which pilot symbols, data symbols and guard symbols are two-dimensionally arranged in a two-dimensional arrangement of pilot symbols and data symbols of a communication frame for an Orthogonal Time Frequency Space (OTFS) transmission system,
- wherein the communication frame comprises first-type blocks and a second-type block, wherein the first-type blocks are at a lower rate than the rate of the second-type block, and wherein the first-type blocks comprise pilot signals, guard signals, and data signals, the second-type block exclusively comprising data signals, wherein the pilot symbols, guard signals, and data symbols of the first-type blocks and the data symbols of the second-type block are being arranged along the points of a grid in the delay-Doppler domain, wherein the communication frame is further characterized in that a first-type block of the first-type blocks is followed by the second-type block, and a second-type block is followed by an another first-type block of the first-type blocks,
- wherein, in the first-type blocks, at least one pilot symbol is surrounded on at least three sides by one or more guard symbols,
- wherein the points of the grid of the first-type blocks in the delay-Doppler domain that are not occupied by pilot symbols or guard symbols are used for data symbols,
- wherein the first transmitter-side transformation unit is adapted to receive, at an input, the two-dimensional communication frame in the delay-Doppler domain that is output from the signal mapper, and to output a two-dimensional arrangement of information symbols in the time-frequency domain, and
- wherein the output of the first transmitter-side transformation unit is provided to an input of the second transmitter-side transformation unit, which is adapted to output a continuous time-domain signal representing the communication frame, for transmission over the communication channel to execute the method of claim 10.

* * * * *